United States Patent
Agashe et al.

(10) Patent No.: US 8,165,104 B2
(45) Date of Patent: *Apr. 24, 2012

(54) METHODS AND SYSTEMS FOR ENHANCING LOCAL REPAIR IN ROBUST HEADER COMPRESSION

(75) Inventors: Parag Arun Agashe, San Diego, CA (US); Haipeng Jin, San Diego, CA (US); Rohit Kapoor, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 830 days.

This patent is subject to a terminal disclaimer.

(21) Appl. No.: 11/096,694

(22) Filed: Mar. 31, 2005

(65) Prior Publication Data

US 2006/0120352 A1    Jun. 8, 2006

Related U.S. Application Data

(60) Provisional application No. 60/634,452, filed on Dec. 8, 2004.

(51) Int. Cl.
*H04L 12/28* (2006.01)

(52) U.S. Cl. ......... 370/350; 714/776

(58) Field of Classification Search .......... 370/216–228, 370/349, 350, 474; 709/247; 714/704, 746, 714/776
See application file for complete search history.

(56) References Cited

U.S. PATENT DOCUMENTS

| 6,680,955 | B1* | 1/2004 | Le | 370/477 |
|---|---|---|---|---|
| 6,754,231 | B1 | 6/2004 | Jonsson et al. | |
| 6,882,637 | B1* | 4/2005 | Le et al. | 370/349 |
| 7,000,166 | B2* | 2/2006 | Hata et al. | 714/746 |
| 7,197,687 | B2* | 3/2007 | Imura et al. | 714/776 |
| 7,392,459 | B2 | 6/2008 | Bernadac et al. | |
| 2002/0146000 | A1 | 10/2002 | Jonsson et al. | |
| 2003/0206534 | A1 | 11/2003 | Wu | |
| 2004/0120357 | A1* | 6/2004 | Kekki | 370/521 |
| 2004/0202167 | A1 | 10/2004 | Jonsson et al. | |
| 2006/0187846 | A1 | 8/2006 | Pelletier et al. | |
| 2007/0041382 | A1 | 2/2007 | Vayanos et al. | |
| 2007/0258458 | A1* | 11/2007 | Kapoor | 370/394 |
| 2009/0104924 | A1* | 4/2009 | Yi et al. | 455/466 |

FOREIGN PATENT DOCUMENTS

| EP | 1370019 A1 | 12/2003 |
|---|---|---|
| JP | 2002158739 A | 5/2002 |
| JP | 2003511981 T | 3/2003 |
| JP | 2003110618 A | 4/2003 |
| JP | 2003514445 T | 4/2003 |

(Continued)

OTHER PUBLICATIONS

C. Borman, et al., "Robust Header Compression (RoHC): Framework and four profiles: RTP, UDP, ESP and uncompressed," Internet Engineering Task Force, (RFC) 3095, Jul. 2001, pp. 1-168.

(Continued)

*Primary Examiner* — Pao Sinkantarakorn
(74) *Attorney, Agent, or Firm* — Kristine U. Ekwueme

(57) ABSTRACT

Methods and systems to enhance local repair in robust header compression (ROHC) decompressors (110, 114), which may improve network transmission efficiency and quality. One method uses lower layer information to enhance local repair at the decompressor (110, 114). Another method uses a User Datagram Protocol (UDP) checksum to enhance local repair at the decompressor (110, 114).

38 Claims, 10 Drawing Sheets

FOREIGN PATENT DOCUMENTS

| | | |
|---|---|---|
| JP | 2008523723 | 7/2008 |
| RU | 2214064 | 10/2003 |
| TW | 441207 | 6/2001 |
| TW | 483266 | 4/2002 |
| WO | WO0079763 A1 | 12/2000 |
| WO | WO0128180 A2 | 4/2001 |
| WO | WO0228017 | 4/2002 |
| WO | WO0228107 A2 | 4/2002 |
| WO | WO03041424 A2 | 5/2003 |

OTHER PUBLICATIONS

Carsten Bormann (ED) et al: Robust Header Compression(ROHC), draft-ietf-rohc-rtp-02 . txt, IETF Standard Working Draft, Internet Engineering Task Force, IETF, CH, vol . rohc, No. 2, Sep. 18, 2000, XP015026696.

European Search Report—EP09008378, Search Authority—Munich Patent Office—Aug. 31, 2009.

International Search Report and Written Opinion—PCT/US2005/044521, International Search Authority—European Patent Office—Aug. 4, 2006.

Network Working Group, Request for Comments 3095, Jul. 2001, pp. 25-26 and 60-61.

Translation of Office Action in Japan application 2009-510079 corresponding to U.S. Appl. No. 11/743,577, citing JP2008523723, JP2003110618, JP2002158739, JP2003511981 and JP2003514445 dated Feb. 15, 2011.

* cited by examiner

METHODS AND SYSTEMS FOR ENHANCING LOCAL REPAIR IN ROBUST HEADER COMPRESSION

CLAIM OF PRIORITY UNDER 35 U.S.C. §119

The present application claims priority to co-assigned U.S. Provisional Application No. 60/634,452, entitled "METHODS AND SYSTEMS FOR ENHANCING LOCAL REPAIR IN ROBUST HEADER COMPRESSION," filed on Dec. 8, 2004, which is incorporated by reference.

BACKGROUND

1. Field

The present application relates generally to wireless communications, and more specifically, to methods and systems that may enhance local repair in robust header decompression.

2. Background

Internet Protocol (IP) is a network protocol used in both wired and wireless networks. For some services and applications, such as voice over IP (VoIP), interactive games, messages, etc., a payload of an IP packet may be almost the same size or even smaller than an IP header of the packet. There may be significant redundancy in header fields within the same packet header and especially between consecutive packets of a packet stream. Header compression (HC) is a process of compressing protocol headers of an IP packet at one end of a link, transmitting them to another end of the link, and decompressing them to their original state at the other end.

BRIEF DESCRIPTION OF THE DRAWINGS

The features, nature, and advantages of the present application will become more apparent from the detailed description below when taken in conjunction with the drawings.

DETAILED DESCRIPTION

Embodiments disclosed herein may be implemented in any wireless and/or wired communication system, such as cellular networks, public switched telephone networks (PSTNs), wireless Internet, satellite networks, wide area networks (WANs), wireless local area networks (WLANs), VoIP networks, IP-based multimedia systems, etc.

Figure 1:
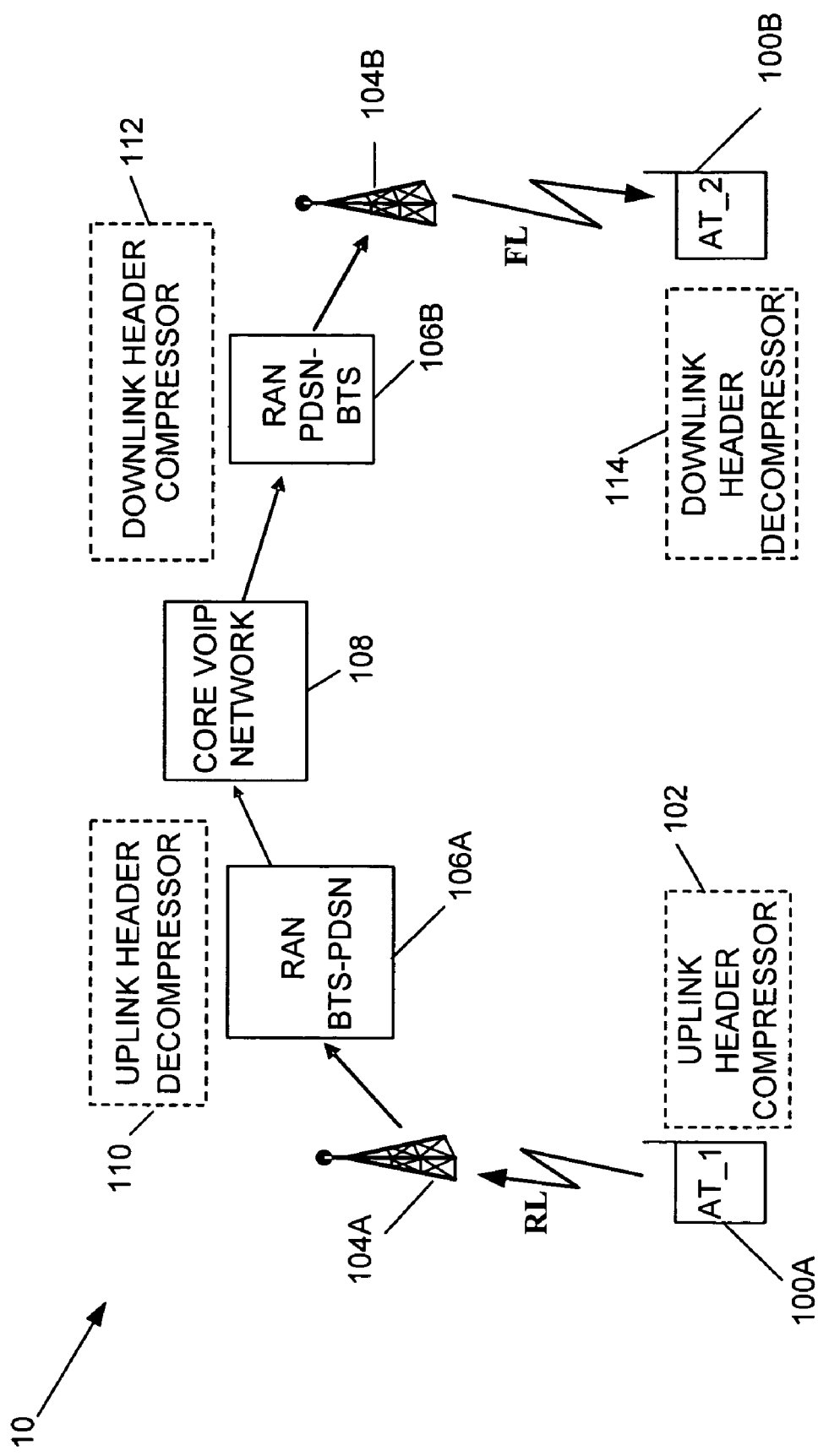
FIG. 1 illustrates a communication system in which one or more methods described herein may be implemented.

FIG. 1 illustrates an example of a communication system 10 in which one or more methods described herein may be implemented. A first access terminal (AT) 100A may include an uplink (or reverse link) header compressor 102. The first access terminal 100A may communicate wirelessly via a reverse link (RL) with a base station 104A and a base station transceiver system/packet data serving node (BTS-PDSN) 106A in a radio access network (RAN).

The BTS-PDSN 106A includes an uplink header decompressor 110, which may perform one or more methods described herein. The BTS-PDSN 106A may communicate with a packet data serving node/base station transceiver system (PDSN-BTS) 106B via a VoIP network 108. The PDSN-BTS 106B may include a downlink (or forward link) header compressor 112.

A second access terminal 100B may communicate wirelessly via a forward link (FL) with a base station 104B and the PDSN-BTS 106B. The second access terminal 100B may include a downlink header decompressor 114, which may perform one or more methods described herein. Instead of two wireless access terminals 100A, 100B, one of the access terminals may be a wired terminal.

The reverse link and forward link may use one or more communication protocols, such as code division multiple access (CDMA) 1x, CDMA 1x EV-DO (Evolution Data Optimized), Wideband CDMA (WCDMA), Time Division Synchronized (TD-SCDMA), Global System for Mobile communications (GSM), etc.

The "access terminal" described herein may refer to various types of devices, such as a wired phone, a wireless phone, a cellular phone, a lap top computer, a wireless communication personal computer (PC) card, a personal digital assistant (PDA), an external or internal modem, etc. An access terminal may be any data device that communicates through a wireless channel or through a wired channel, for example using fiber optic or coaxial cables. An access terminal may have various names, such as access unit, subscriber unit, mobile station, mobile device, mobile unit, mobile phone, mobile, remote station, remote terminal, remote unit, user device, user equipment, handheld device, etc. Access terminals may be mobile or stationary and may be dispersed throughout the communication system 10 of FIG. 1. Access terminals may communicate with one or more base station transceiver systems (BTSs), which may be called (or include) base stations, access networks, access points, Node Bs, and modem pool transceivers (MPTs).

Figure 2:
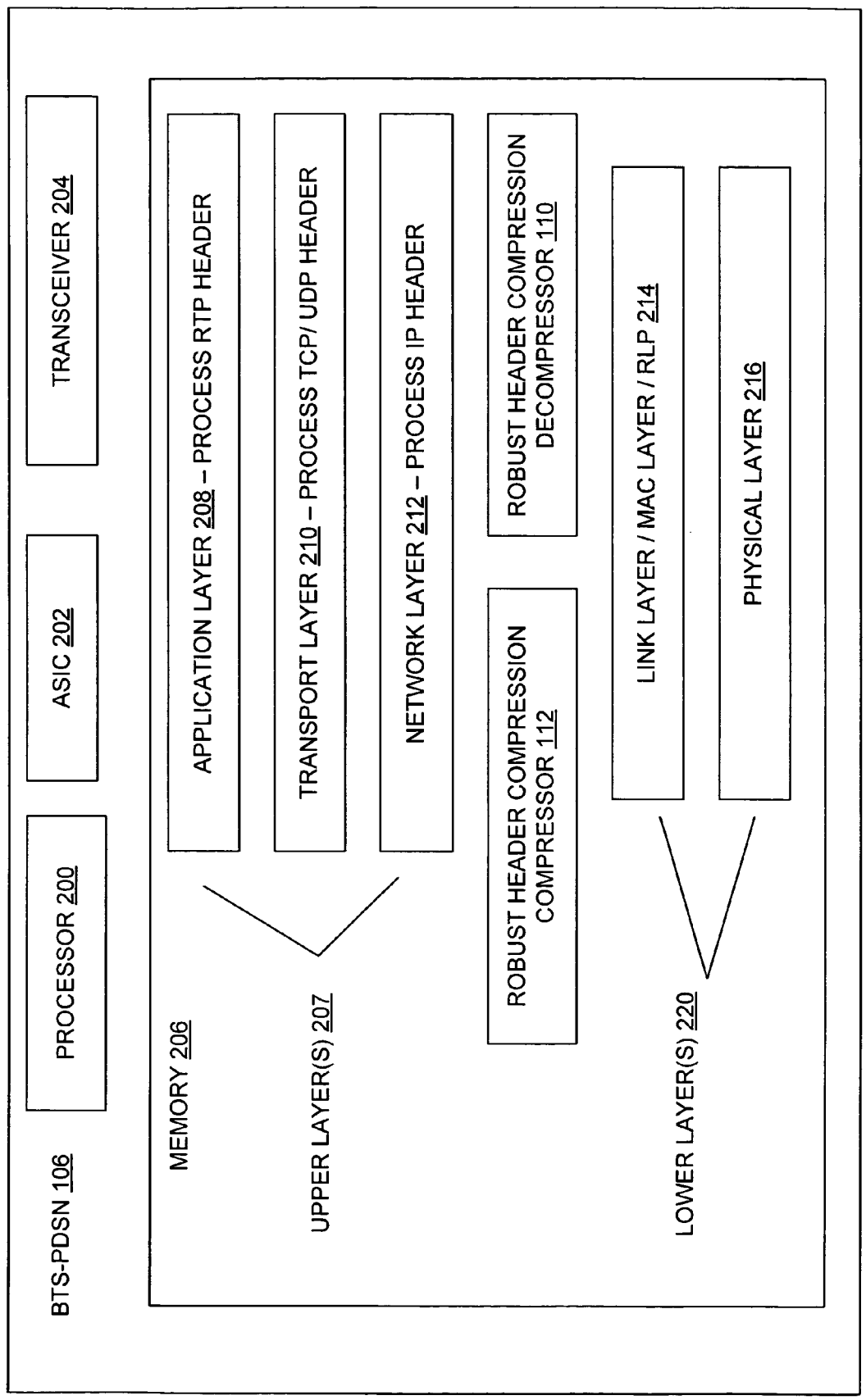
FIG. 2 illustrates some hardware and software components of a base station transceiver system/packet data serving node (BTS-PDSN) or PDSN-BTS of FIG. 1.

FIG. 2 illustrates some hardware and software components of the BTS-PDSN 106A and/or PDSN-BTS 106B of FIG. 1, such as a processor 200, an application specific integrated circuit (ASIC) and other hardware 202, a transceiver 204, and a memory 206. The memory 206 may store one or more upper layers 207, such as an application layer 208, a transport layer 210, and a network layer 212. The application layer 208 may process Real Time Transport Protocol (RTP or RTTP) headers. The transport layer 210 may process Transmission Control Protocol (TCP) and User Datagram Protocol (UDP) headers. The network layer 212 may process IP headers.

The memory 206 may also store a robust header compression compressor 112, a robust header compression decompressor 110 and one or more lower layers 220, such as a link layer and a Medium Access Control (MAC) layer 214, which may include a Radio Link Protocol (RLP) sublayer, and a physical layer 216.

Figure 3:
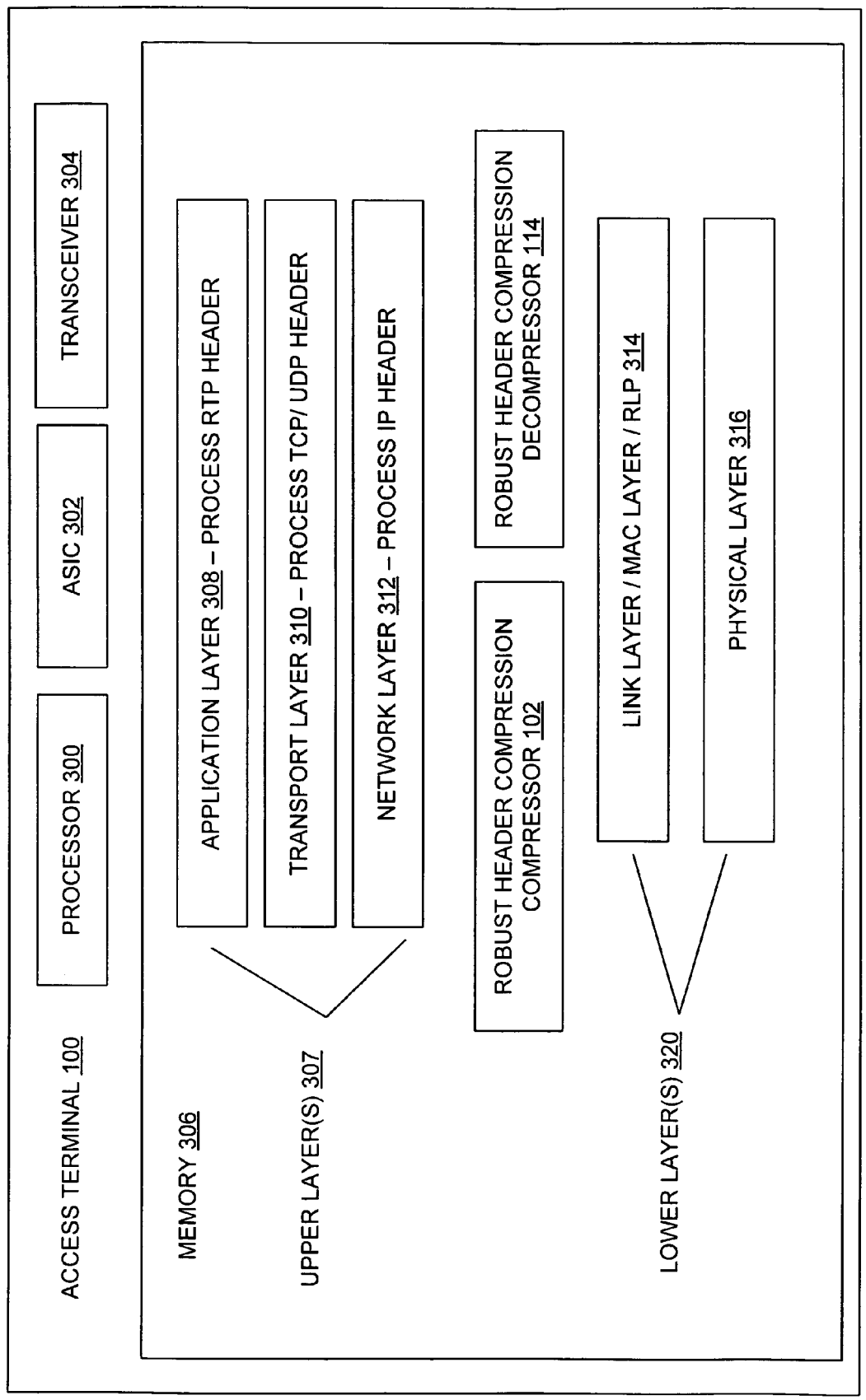
FIG. 3 illustrates some hardware and software components of an access terminal of FIG. 1.

FIG. 3 illustrates some hardware and software components of the access terminals 100A, 100B of FIG. 1, such as a processor 300, an ASIC 302 and other hardware, a transceiver 304, and a memory 306. The memory 306 may store one or more upper layers 307, such as an application layer 308, a transport layer 310, and a network layer 312. The application layer 308 may process RTP headers. The transport layer 310 may process TCP and UDP headers. The network layer 312 may process IP headers.

The memory 306 may also store a robust header compression compressor 102, a robust header compression decompressor 114 and one or more lower layers 320, such as a link layer and a MAC layer 314, which may include a RLP sublayer, and a physical layer 316.

Figure 8:
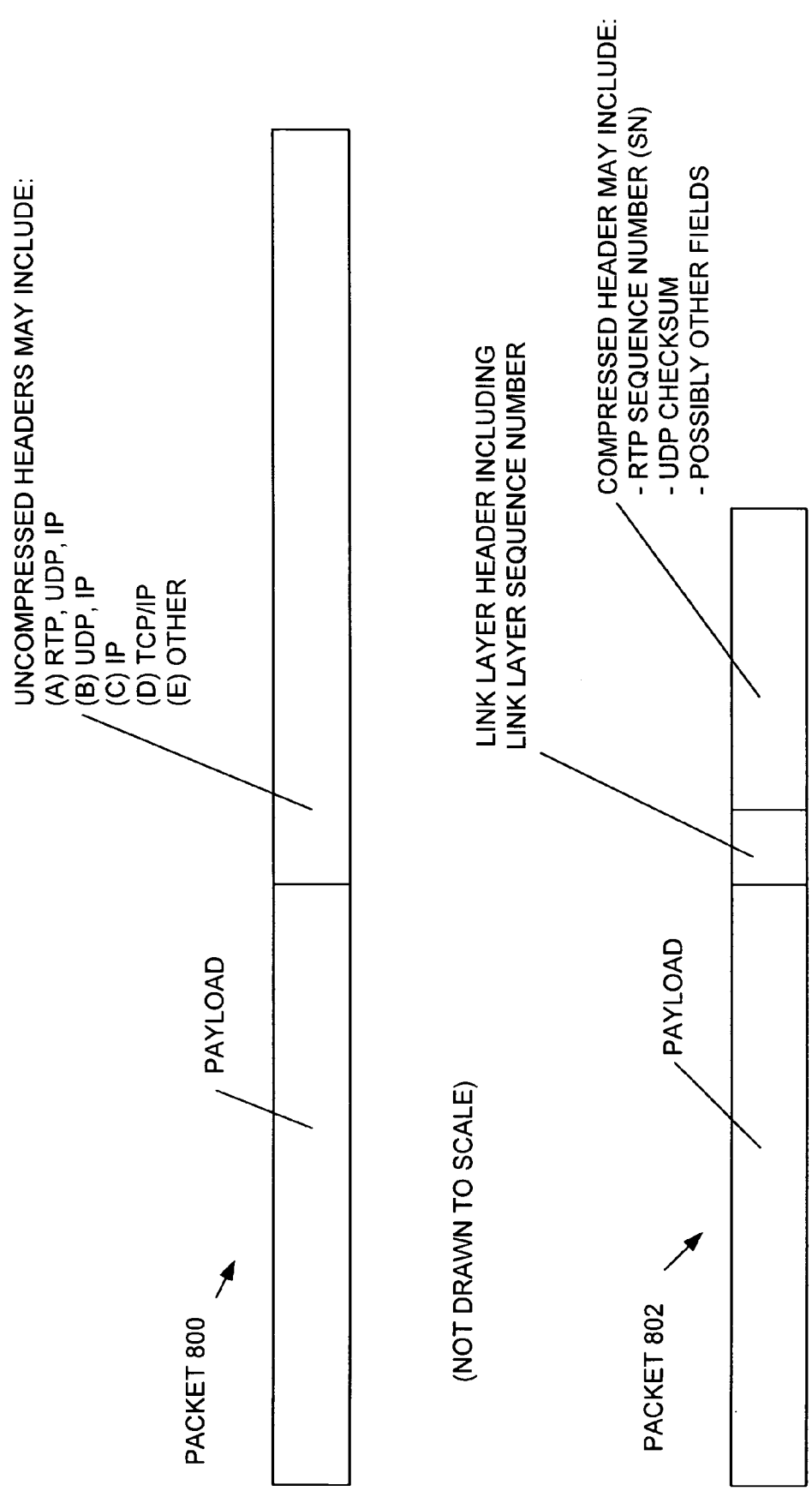
FIG. 8 illustrates an example of a packet with uncompressed headers and a packet with a compressed header.

FIG. 8 illustrates an example of a packet 800 with a payload and uncompressed headers (e.g., IP, UDP, RTP, TCP, and other headers) and a packet 802 with a payload and a compressed header. The compressed header may include a RTP sequence number, an UDP checksum and possibly other fields. The compressed packet 802 may also include a link layer header including a link layer sequence number.

Packets with IP, UDP, and RTP headers sent over wireless links may benefit considerably from header compression because wireless networks have limited bandwidth. Header compression and decompression may improve network transmission efficiency, quality, and/or speed with bandwidth savings (due to reduced packet header overhead), reduce packet loss, improve interactive response time, and decrease infrastructure cost (more users per channel bandwidth and hence less deployment costs). A communication system may compress protocol headers on a per-hop basis over point-to-point connections, which may include many hops. A "hop" refers to a communication link from one device to another device or a network element Some header compression schemes, however, may not perform well over wireless (e.g., cellular) links due to the high error rates (e.g., bit error rates (BERs)) and long roundtrip times of wireless links, especially as wireless topologies and traffic patterns become more complex. The present disclosure describes robust header compression (ROHC) and decompression schemes, which may overcome shortcomings of other methods.

Robust header compression is described in Request For Comments (RFC) 3095, entitled "Robust Header Compression (ROHC): Framework and four profiles: RTP, UDP, ESP and uncompressed," which was an Internet standards track protocol distributed by the Network Working Group of The Internet Society in July, 2001. A "robust" header compression scheme may tolerate loss and residual errors on a link over which header compression takes place without losing additional packets or introducing additional errors in decompressed headers.

"Context of a compressor" refers to state information a compressor uses to compress a header, and "context of a decompressor" refers to state information a decompressor uses to decompress a header. The context may contain relevant information from previous headers in the packet stream, such as static fields and possible reference values for compression and decompression. The context may contain additional information describing the packet stream, such as information about how an IP Identifier field changes and the typical inter-packet increase in sequence numbers or timestamps.

"Context damage" occurs when the context of the decompressor is not consistent with the context of the compressor, and decompression may fail to reproduce the original header. This situation may occur when the context of the decompressor has not been initialized properly or when packets have been lost or damaged between compressor and decompressor. Packets that cannot be decompressed due to inconsistent contexts are "lost" due to context damage. Packets that are decompressed but contain errors due to inconsistent contexts are "damaged" due to context damage.

ROHC may use a cyclic redundancy check (CRC) over an original header to detect incorrect decompression. In order to reduce computational complexity, the fields of the header may be conceptually rearranged when the CRC is computed, so that it is first computed over octets which are static (called CRC-STATIC) and then over octets whose values are expected to change between packets (CRC-DYNAMIC). In this manner, the intermediate result of the CRC computation, after it has covered the CRC-STATIC fields, can be reused for several packets.

Most header fields may be compressed away since they may never or seldom change. In one example, only five fields, with a combined size of about 10 octets, may need more sophisticated mechanisms. These fields may include:
    IPv4 Identification (16 bits) (IP-ID)
    UDP Checksum (16 bits)
    RTP Marker (1 bit) (M-bit)
    RTP Sequence Number (16 bits) (SN)
    RTP Timestamp (32 bits) (TS)

Least Significant Bits (LSBs) encoding may be used for header fields whose values are usually subject to small changes. With LSB encoding, the k least significant bits of the field value are transmitted instead of the original field value, where k is a positive integer. After receiving k bits, the decompressor derives the original value using a previously received value as a reference (v_ref). LSB encoding and decoding may be correct if the compressor and the decompressor each use interpretation intervals in which the original value resides, and in which the original value is the only value that has the exact same k least significant bits as those transmitted.

The "interpretation interval" may be described as a function f (v_ref, k):

$$f(v\_ref, k) = [v\_ref - p, v\_ref + (2^k - 1) - p]$$

where p is an integer.

This equation may be shown as:

The function f has the following property: for any value k, the k least significant bits will uniquely identify a value in f (v_ref, k).

The parameter p allows the interpretation interval to be shifted with respect to v_ref. Choosing an appropriate value for p may yield more efficient encoding for fields with certain characteristics.

The values to be encoded may have a finite range. For example, the RTP SN ranges from 0 to 0xFFFF. When the SN value is close to 0 or 0xFFFF, the interpretation interval can straddle the wraparound boundary between 0 and 0xFFFF.

RFC 3095 describes how a ROHC compressor may use "window-based least significant bits (LSBs) encoding" to compress dynamic fields in protocol headers. The compressor may not be able to determine the exact value of v_ref_d that will be used by the decompressor for a particular value v, since some candidates for v_ref_d may have been lost or damaged. However, by using feedback or by making reasonable assumptions, the compressor can limit the candidate set. The compressor then calculates k such that no matter which v_ref_d in the candidate set the decompressor uses, v is covered by the resulting interval_d. Since the decompressor may use the last received value where the CRC succeeded as the reference value, the compressor maintains a "sliding window" containing the candidates for v_ref_d. The sliding window may initially be empty.

When many consecutive packets are lost between the ROHC compressor and decompressor, there is a risk of sequence number (SN) LSB wraparound, i.e., the LSBs of sequence numbers in compressed packets may be interpreted incorrectly because the decompressor has not moved the interpretation interval for lack of input.

A ROHC decompressor may use a local repair mode to detect situations where a number of consecutive lost packets (between the compressor and decompressor) can cause context damage. The ROHC decompressor may detect this situation and avoid context damage by using a local clock. For example, the ROHC decompressor may use the following algorithm described in RFC 3095:

(a) The decompressor notes the arrival time, a(i), of each incoming packet i. Arrival times of packets where decompression failed are discarded.

(b) When decompression fails, the decompressor computes INTERVAL=a(i)-a(i−1), which is the time elapsed between the arrival of the previous, correctly decompressed packet and the current packet.

(c) If wraparound has occurred, INTERVAL will correspond to at least $2^k$ inter-packet times, where k is the number of SN bits in the current header. A moving average of arrival times may be used to estimate packet inter-arrival time. Based on the estimate of packet inter-arrival time, the decompressor determines if INTERVAL can correspond to $2^k$ inter-packet times.

(d) If INTERVAL is determined to be at least $2^k$ packet inter-arrival times, the decompressor adds $2^k$ to the reference SN and attempts to decompress the packet using the new reference SN.

(e) If this decompression succeeds, the decompressor updates the context but should not deliver the packet to upper layers. The following packet is also decompressed and updates the context if its CRC succeeds, but should be discarded. If decompression of the third packet using the new context also succeeds, the context repair is deemed successful and this third packet and subsequent decompressed packets are delivered to the upper layers.

(f) If any of the three decompression attempts in (d) and (e) fails, the decompressor discards the packets and may act according to rules (a) through (c) in section 5.3.2.2.3 of RFC 3095.

Using the above local repair mode, the decompressor may be able to repair the context after excessive loss at the expense of discarding two correctly decompressed packets before concluding that the context has been repaired. The reason that the ROHC decompressor needs to discard two packets (not passed to the upper layer) is that the ROHC 3-bit CRC is a relatively weak check, and hence incorrectly decompressed packets may pass the CRC.

Embodiments described below may enhance or improve the local repair mode in a ROHC decompressor, such as decompressors 110, 114 in FIGS. 1-3. In one embodiment, the ROHC decompressor in local repair mode uses lower layer information, such as link layer sequence numbers, in addition to the ROHC 3-bit CRC, to determine whether to pass packets to an upper layer. In another embodiment, the ROHC decompressor in local repair mode uses UDP checksum (when enabled), in addition to the ROHC 3-bit CRC, to determine whether to pass packets to an upper layer. A decompressor may be configured to select one of the two methods depending on one or more conditions. These embodiments may improve performance without changing the ROHC standard.

Using Lower Layer Information in Decompression Repair

Figure 4:
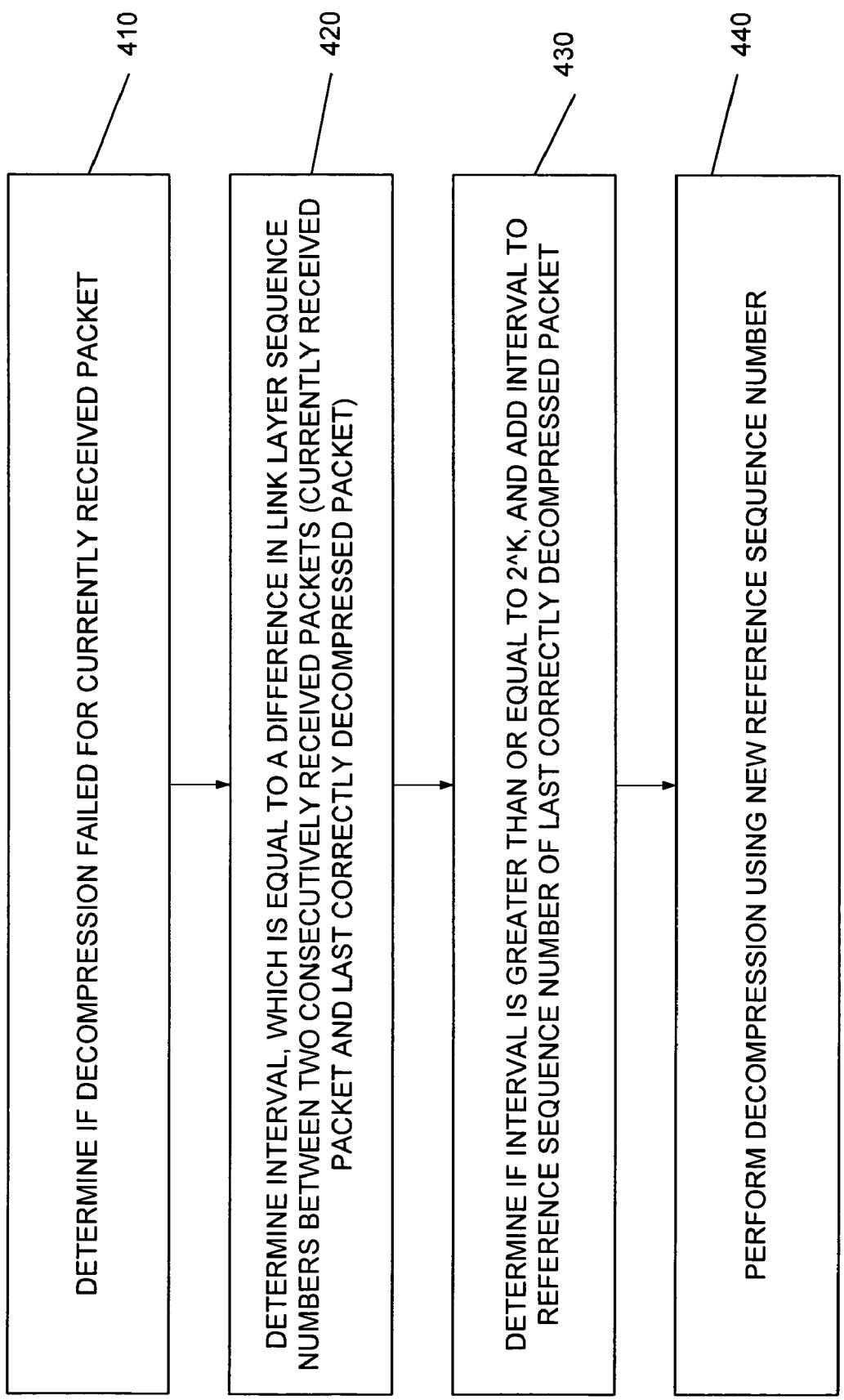
FIG. 4 illustrates a method for enhancing local repair in robust header decompression, which may be used by the system of FIG. 1.

FIG. 4 illustrates a method that uses link layer information to enhance the local repair mode in a ROHC decompressor 110, 114. The link layer 214, 314 (a lower layer in FIGS. 2 and 3) adds a link layer sequence number (SN) to each packet compressed by the compressor 112, 102. The sequence number should increase by one ("1") for each link layer packet sent over a particular instantiation of the link layer. There is a one-to-one mapping between IP packets and link-layer packets corresponding to a particular link layer instantiation. If this one-to-one mapping is violated, the method described below may still work.

At 410 in FIG. 4, the decompressor determines if decompression failed for a currently received packet, for example, by detecting a decompression error. If decompression failed, the decompressor at 420 determines the difference in link layer sequence numbers between two consecutively-received packets, i.e., link layer sequence number of the last correctly decompressed, received packet and link layer sequence number of currently received packet. This difference may be referred to as INTERVAL, which is not the same as the "interpretation interval" or "INTERVAL" mentioned above with reference to RFC 3095.

At 430, the decompressor determines if INTERVAL is equal to at least $2^k$, where k is the number of sequence number bits in the current packet. If INTERVAL is equal to at least $2^k$, the decompressor adds INTERVAL to the sequence number of the last correctly decompressed, received packet (called the reference sequence number). This action may be referred to as repairing information used for decompression.

At 440, the decompressor attempts to decompress the current packet using the new reference sequence number.

If this decompression succeeds, the decompressor updates its context and delivers the packet to the upper layer(s). If decompression fails, the decompressor may discard the packets and act according to rules (a) through (c) in section 5.3.2.2.3 of RFC 3095.

In addition to improving the local repair mode, another advantage of using the link layer sequence number is that it enables the decompressor to handle excessive re-ordering on the link. The link layer sequence number helps identify the correct positions of late-arrival ROHC packets, so the decompressor can correctly infer the RTP sequence number from the reference value in the current context of the decompressor.

In some situations, there may not be a one-to-one mapping between the link layer sequence number and the RTP sequence number. For example, on a reverse link in a wireless network, a user at a cell edge (e.g., working at 4.8 kbps) may need to send one RTP/UDP/IP voice packet in two RLP (radio link protocol) segments.

Figure 5:
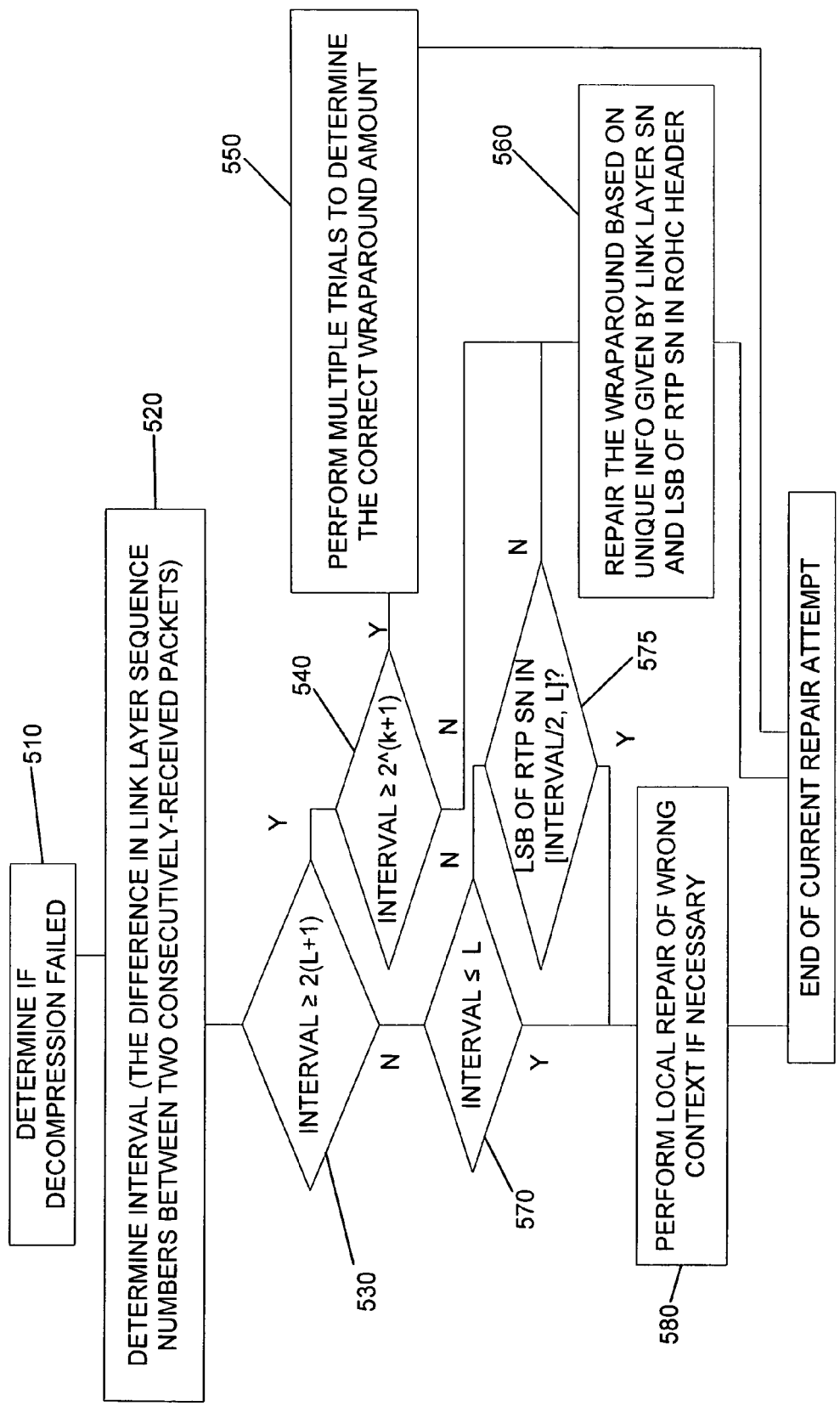
FIG. 5 illustrates another method for enhancing local repair in robust header decompression, which may be used by the system of FIG. 1.

FIG. 5 shows a method that can be used in such situations (no one-to-one mapping between the link layer sequence number and the RTP sequence number) to determine whether SN wraparound occurred and how to perform local repair. The following method assumes that the RTP sequence number and the link layer sequence number for the last correct decompressed packet are zero ("0"). A non-zero reference value situation can be handled by first performing a difference operation.

At 510, the decompressor determines if decompression failed, for example, by detecting a decompression error. If decompression failed, the decompressor at 520 computes INTERVAL, which is the difference in link layer sequence numbers between two consecutively-received packets, i.e., link layer sequence number of current packet minus a reference value (link layer sequence number of last received, correctly decompressed packet).

(1) The LSB interpretation interval (described above) may have a right half with a length expressed as L, where L is smaller than $2^k$. If INTERVAL is greater than or equal to $2*(L+1)$ at 530, then a wraparound occurred.

(a) If INTERVAL is greater than or equal to $2^{(k+1)}$ at 540, then the decompressor at 550 attempts to determine the correct wraparound amount by decompressing the packet with multiple trials using interpretation intervals $[L+1, 2*(L+1)-1]$, $[2*(L+1), 3*(L+1)-2]$, . . . , $[k*(L+1), (k+1)*(L+1)-(k)]$, where INTERVAL is defined as $k*(L+1) \leq INTERVAL \leq (k+1)*(L+1)-(k)$. Because decompression in the correct interval will pass the ROHC's 3-bit CRC, at least one of these decompressions will be successful. If only one of the decompressions is successful, the packet can be sent to the upper layer. If more than one of the decompressions are successful, the decompressor may not be sure about the correct interpretation interval, and the packets are not sent to the upper layer.

(b) If INTERVAL is less than $2^{(k+1)}$ at 540, the actual RTP SN lies between [INTERVAL/2, INTERVAL]. Because INTERVAL/2 is less than or equal to $2^k$, the LSB of RTP SN, which contain k bits, can be used to uniquely identify the correct RTP SN position at 560. The decompressor can repair the wraparound based on unique information given by link layer SN and LSB of RTP SN in the ROHC header.

(2) If INTERVAL is less than or equal to L at 570, then there is no wraparound and the method performs local repair of wrong context if necessary at 580.

(3) If INTERVAL is in the range $[L+1, 2*(L+1)-1]$ at 575, then there may or may not be a RTP SN LSB wraparound. Given that the RTP SN lies in the range [INTERVAL/2, INTERVAL] at 575 with a length smaller than $2^k$, the LSB of RTP SN carried in the ROHC header can be used to uniquely decide the actual position of RTP SN and thus decide whether SN wraparound repair needs to be performed at 560.

The method of FIG. 5 works even if there are IP packet losses before the ROHC compressor.

Figure 6:
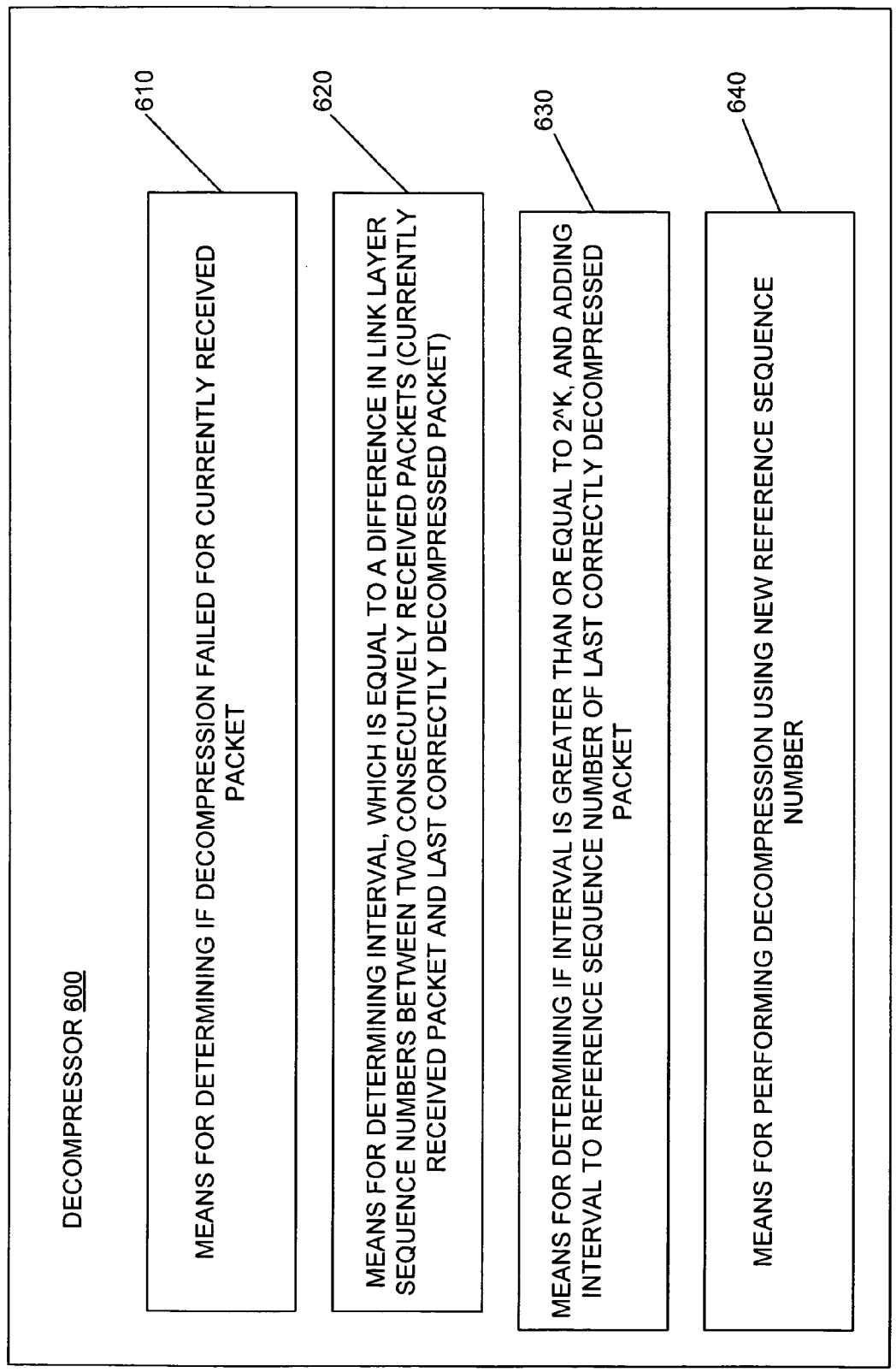
FIG. 6 illustrates a decompressor apparatus corresponding to the method of FIG. 4.

FIG. 6 illustrates a decompressor apparatus 600 corresponding to the method of FIG. 4. The decompressor apparatus 600 comprises means 610 for determining if decompression failed for currently received packet, means 620 for determining interval, which is equal to a difference in link layer sequence numbers between two consecutively received packets (currently received packet and last correctly decompressed packet), means 630 for determining if interval is greater than or equal to $2^k$, and adding interval to reference sequence number of last correctly decompressed packet, and means 640 for performing decompression using new reference sequence number.

Figure 7:
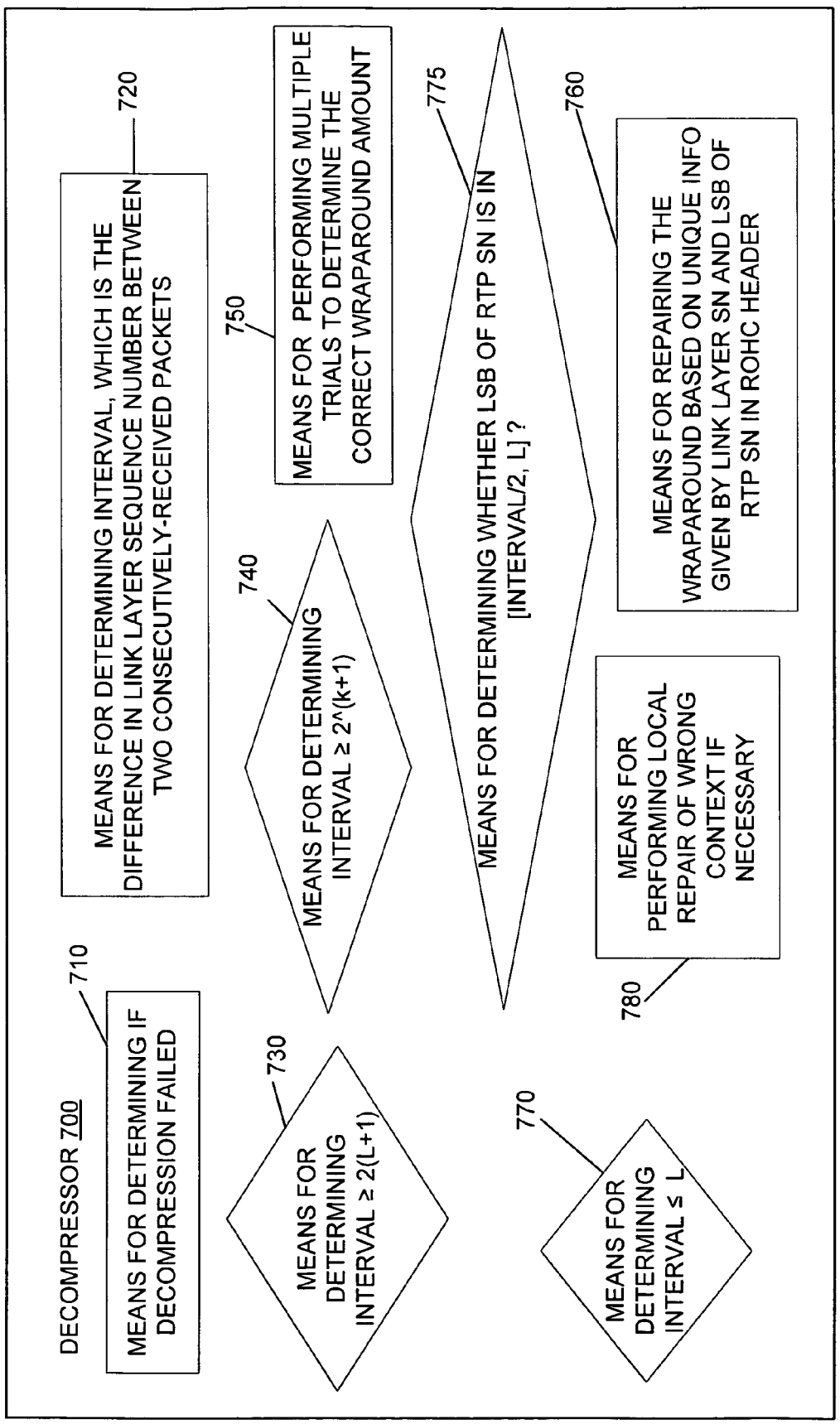
FIG. 7 illustrates a decompressor apparatus corresponding to the method of FIG. 5.

FIG. 7 illustrates a decompressor apparatus 700 corresponding to the method of FIG. 5. The decompressor apparatus 700 comprises means 710 for determining if decompression failed, means 720 for determining interval, which is the difference in link layer sequence number between two consecutively-received packets, means 730 for determining $interval \geq 2(L+1)$, means 740 for determining $interval \geq 2^{(k+1)}$, means 750 for performing multiple trials to determine the correct wraparound amount, means 760 for repairing the wraparound based on unique info given by link layer SN and LSB of RTP SN in ROHC header, means 770 for determining $interval \leq L$, means 775 for determining whether LSB of RTP SN is in [interval/2, L], means 780 for performing local repair of wrong context if necessary.

Using UDP Checksum in Decompression Repair

Another method may use a UDP checksum (FIG. 8) to enhance/improve the local repair mode in the ROHC decompressor. Using the UDP checksum (if it is present) may enable the ROHC decompressor to have greater confidence in decompressed packets during the local repair mode. For this method, the UDP checksum should be enabled in the IP flow. The following method improves the local repair mode in ROHC RFC 3095 by using a UDP checksum.

(a) The decompressor notes the arrival time a(i) of each incoming packet i. Arrival times of packets where decompression failed are discarded.

(b) When decompression fails, the decompressor computes INTERVAL=a(i)-a(i−1), i.e., the time elapsed between the arrival of the previous, correctly decompressed packet and the current packet.

(c) If wraparound has occurred, INTERVAL will correspond to at least $2^k$ inter-packet times, where k is the number of SN bits in the current header. On the basis of an estimate of the packet inter-arrival time, obtained for example using a moving average of arrival times, TS_STRIDE, or TS_TIME, the decompressor judges if INTERVAL can correspond to $2^k$ inter-packet times.

(d) If INTERVAL is judged to be at least $2^k$ packet inter-arrival times, the decompressor adds $2^k$ to the reference SN and attempts to decompress the packet using the new reference SN.

(e) If this decompression succeeds and the UDP checksum passes, the decompressor updates the context and delivers the packet to the upper layer. If the decompression fails or the UDP checksum does not pass, the decompressor discards the packets and may act according to rules (a) through (c) of section 5.3.2.2.3.

The UDP checksum (when enabled) may also be used in the methods of FIG. 4 or 5 to further verify whether decompression is successful.

Figure 9:
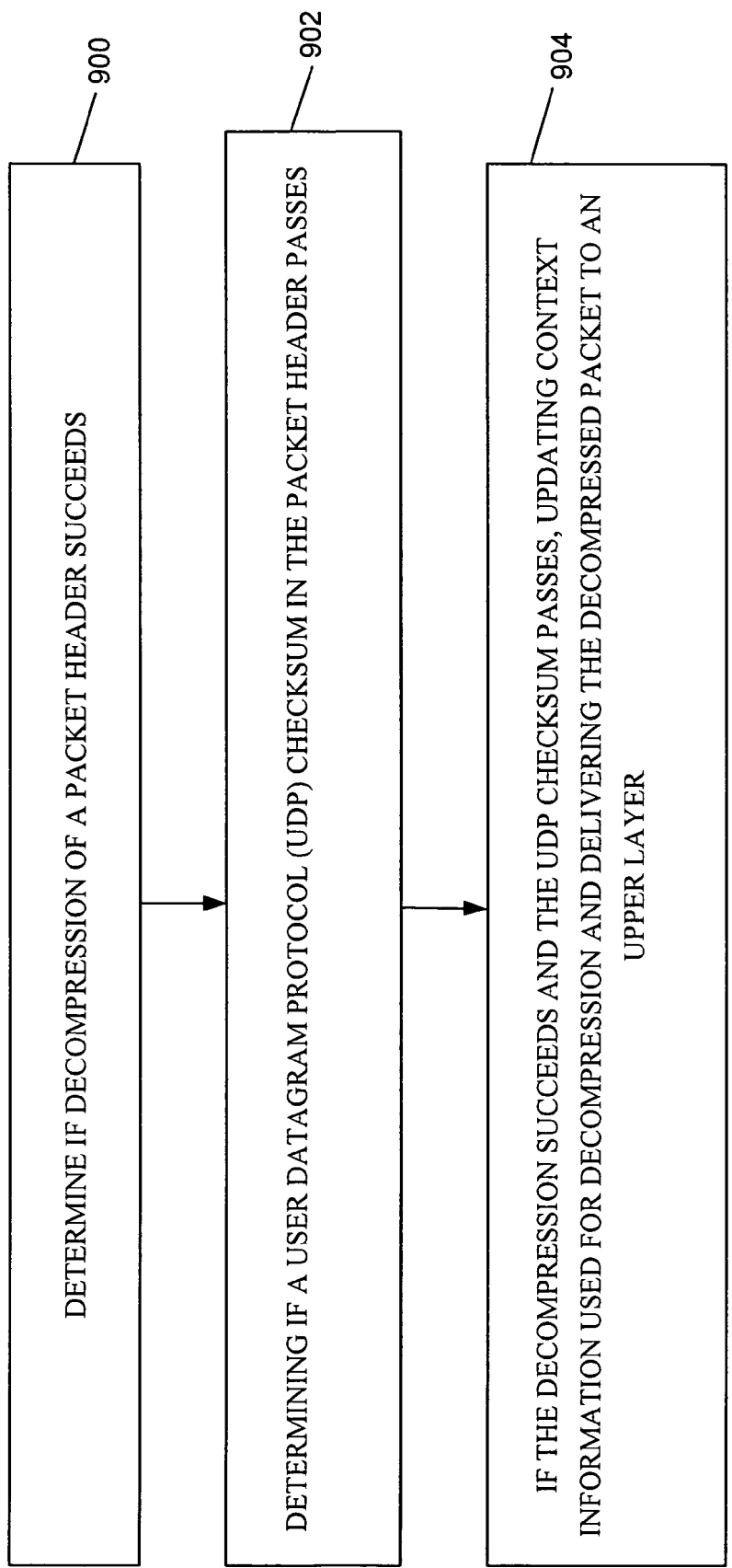
FIG. 9 illustrates a method of using a checksum in determining if decompression succeeds.

FIG. 9 illustrates a method of using the UDP checksum as described above. At 900, the method determines if decompression of a packet header succeeds. At 902, the method determines if a User Datagram Protocol (UDP) checksum in the packet header passes. At 904, if the decompression succeeds and the UDP checksum passes, the method updates context information used for decompression and delivers the decompressed packet to an upper layer.

Figure 10:
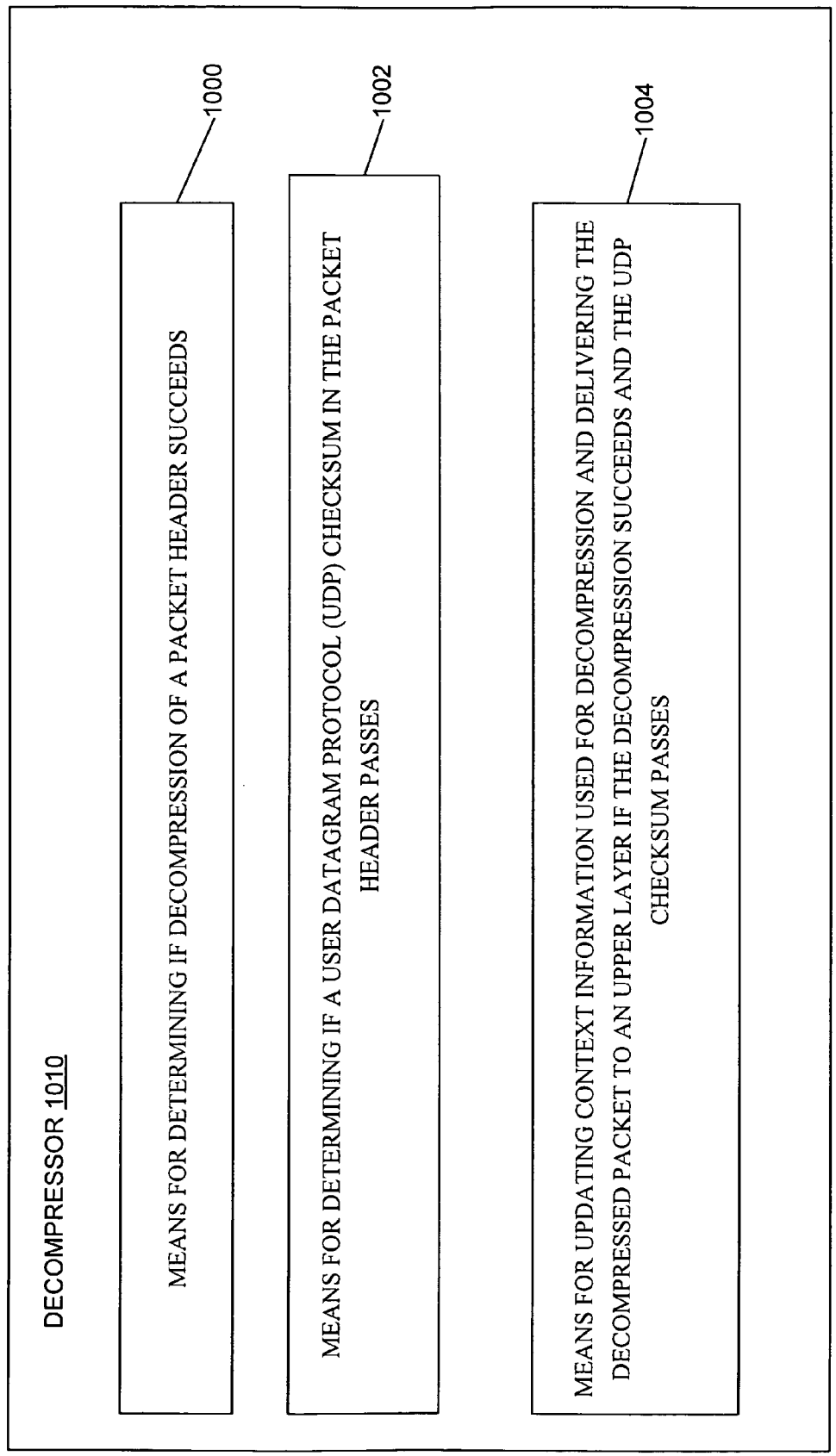
FIG. 10 illustrates a decompressor corresponding to the method of FIG. 9.

FIG. 10 illustrates a decompressor 1010 corresponding to the method of FIG. 9. The decompressor 1010 comprises means 1000 for determining if decompression of a packet header succeeds, means 1002 for determining if a User Datagram Protocol (UDP) checksum in the packet header passes, means 1004 for updating context information used for decompression and delivering the decompressed packet to an upper layer if the decompression succeeds and the UDP checksum passes.

The various illustrative logical blocks, modules, and circuits described in connection with the embodiments disclosed herein may be implemented or performed with a general purpose processor, a digital signal processor (DSP), an ASIC, a field programmable gate array (FPGA), or other programmable logic device, discrete gate or transistor logic, discrete hardware components, or any combination thereof designed to perform the functions described herein. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. A storage medium is coupled to the processor such that the processor can read information from, and write information to, the storage medium. In the alternative, the storage medium may be integral to the processor. The processor and the storage medium may reside in an ASIC. The ASIC may reside in an access terminal. In the alternative, the processor and the storage medium may reside as discrete components in an access terminal.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The previous description of the disclosed embodiments is provided to enable any person skilled in the art to make or use the present application. Various modifications to these embodiments will be readily apparent to those skilled in the art, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. A method for decompressing a header of a current packet, the method comprising:
   receiving at least a previous packet and the current packet, wherein the previous packet comprises the first link layer sequence number, and wherein the current packet comprises a header of the current packet and a second link layer sequence number;
   determining whether decompression of the header of the current packet failed by receiving a decompression error for the header of the current packet after attempting to decompress the header of the current packet;
   if the decompression of the header of the current packet failed, determining a difference in link layer sequence numbers between the first link layer sequence number of the previous packet and the second link layer sequence number of the current packet, to generate repaired information used for header decompression;
   if the difference in link layer sequence numbers is determined, determining if the difference between the first link layer sequence number and the second link layer sequence number is greater than or equal to $2^k$, where k is a number of link layer sequence number bits in the current packet, and if the difference is greater than or equal to $2^k$, adding the difference to the first link layer sequence number to generate the repaired information; and
   decompressing the header of the current packet with the repaired information.

2. The method of claim 1, further comprising using the repaired information to re-order one or more packets.

3. The method of claim 1, further comprising updating context information used for decompression and delivering the current packet to an upper layer.

4. The method of claim 1, further comprising receiving the previous packet and the current packet over a wireless link.

5. The method of claim 1, wherein the header comprises information related to at least one of Internet Protocol (IP), Real Time Transport Protocol (RTP), User Datagram Protocol (UDP), and Transmission Control Protocol (TCP).

6. The method of claim 1, further comprising determining whether sequence number wraparound occurred.

7. The method of claim 6, wherein determining whether sequence number wraparound occurred comprises:
   determining if the difference is greater than or equal to $2*(L+1)$, where L is a length of half of an interpretation interval used for decompression;
   if the difference is determined to be greater than or equal to $2*(L+1)$, then determining if the difference is greater than or equal to $2^{(k+1)}$;
   if the difference is determined to be greater than or equal to $2^{(k+1)}$, then decompressing the header of the current packet a plurality of times using a plurality of interpretation intervals; and
   if decompressing the header is successful in only one of the interpretation intervals, passing the current packet to an upper layer.

8. The method of claim 7, wherein the interpretation intervals comprise $[L+1, 2*(L+1)-1]$, $[2*(L+1), 3*(L+1)-2]$, ..., $[k*(L+1), (k+1)*(L+1)-(k)]$, where INTERVAL is defined as $k*(L+1) \leq INTERVAL \leq (k+1)*(L+1)-(k)h$.

9. The method of claim 7, further comprising:
   if the difference is determined to be less than $2^{(k+1)}$, then repairing the wraparound based on information given by a link layer sequence number and least significant bits (LSBs) of a radio transport protocol (RTP) sequence number in the header.

10. The method of claim 7, further comprising:
    if the difference is determined to be less than $2*(L+1)$, then determining if the difference is less than or equal to L;
    if the difference is less than or equal to L, then performing local repair of decompression context information.

11. The method of claim 7, further comprising:
    determining if least significant bits (LSBs) of a radio transport protocol (RTP) sequence number in the header is in the range of $[INTERVAL/2, L]$;
    if least significant bits (LSBs) of the radio transport protocol (RTP) sequence number in the header is in the range of [INTERVAL/2, L], then performing local repair of decompression context information;

if least significant bits (LSBs) of the radio transport protocol (RTP) sequence number in the header is not in the range of [INTERVAL/2, L], then repairing the wraparound based on information given by a link layer sequence number and least significant bits (LSBs) of a radio transport protocol (RTP) sequence number in the header.

12. The method of claim 1, wherein the determining the difference in the link layer sequence numbers is performed in a link layer.

13. An apparatus configured to decompress a header of a current packet, the apparatus comprising a decompressor configured to:

receive at least a previous packet and the current packet, wherein the previous packet comprises a first link layer sequence number, and wherein the current packet comprises the header of the current packet and a second link layer sequence number;

determine whether decompression of the header of the current packet failed by receiving a decompression error for the header of the current packet after attempting to decompress the header of the current packet;

determine, if the decompression of the header of the current packet failed, a difference in link layer sequence numbers between the first link layer sequence number of the previous packet and the second link layer sequence number of the current packet, to generate repaired information used for header decompression;

determine, if the difference in link layer sequence numbers is determined, if the difference between the first link layer sequence number and the second link layer sequence number is greater than or equal to $2^k$, where k is a number of link layer sequence number bits in the current packet, and if the difference is greater than or equal to $2^k$, adding the difference to the first link layer sequence number to generate the repaired information; and decompress the header of the current packet with the repaired information.

14. The apparatus of claim 13, wherein the apparatus is further configured to use the repaired information to re-order one or more received packets.

15. The apparatus of claim 13, wherein the decompressor is further configured to update context information used for decompression and deliver the current packet to an upper layer.

16. The apparatus of claim 13, further comprising a transceiver to receive the previous packet and the current packet over a wireless link.

17. The apparatus of claim 13, wherein the header comprises information related to at least one of Internet Protocol (IP), Real Time Transport Protocol (RTP), User Datagram Protocol (UDP), and Transmission Control Protocol (TCP).

18. The apparatus of claim 13, wherein the decompressor is further configured to determine whether sequence number wraparound occurred.

19. The apparatus of claim 18, wherein determining whether sequence number wraparound occurred comprises:

determining if the difference is greater than or equal to $2*(L+1)$, where L is a length of half of an interpretation interval used for decompression;

if the difference is determined to be greater than or equal to $2*(L+1)$, then determining if the difference is greater than or equal to $2^{(k+1)}$;

if the difference is determined to be greater than or equal to $2^{(k+1)}$, then decompressing the header of the current packet a plurality of times using a plurality of interpretation intervals; and if decompressing the header is successful in only one of the interpretation intervals, passing the current packet to an upper layer.

20. The apparatus of claim 19, wherein the interpretation intervals comprise $[L+1, 2*(L+1)-1]$, $[2*(L+1), 3*(L+1)-2]$, ..., $[k*(L+1), (k+1)*(L+1)-(k)]$, where INTERVAL is defined as $k*(L+1) \leq INTERVAL \leq (k+1)*(L+1)-(k)$.

21. The apparatus of claim 19, wherein the decompressor is further configured to:

if the difference is determined to less than $2^{(k+1)}$, then repair the wraparound based on information given by a link layer sequence number and least significant bits (LSBs) of a radio transport protocol (RTP) sequence number in the header.

22. The apparatus of claim 19, wherein the decompressor is further configured to:

if the difference is determined to be less than $2*(L+1)$, then determine if the difference is less than or equal to L;

if the difference is less than or equal to L, then perform local repair of decompression context information.

23. The apparatus of claim 19, wherein the decompressor is further configured to:

determine if least significant bits (LSBs) of a radio transport protocol (RTP) sequence number in the header is in the range of [INTERVAL/2, L];

if least significant bits (LSBs) of the radio transport protocol (RTP) sequence number in the header is in the range of [INTERVAL/2, L], then perform local repair of decompression context information;

if least significant bits (LSBs) of the radio transport protocol (RTP) sequence number in the header is not in the range of [INTERVAL/2, L], then repair the wraparound based on information given by a link layer sequence number and least significant bits (LSBs) of a radio transport protocol (RTP) sequence number in the header.

24. The apparatus of claim 13, wherein the determining the difference in the link layer sequence numbers is performed in a link layer.

25. The apparatus of claim 13, further comprising at least one of a base station and a terminal, with which the apparatus is integrated.

26. An apparatus configured to decompress a header of a current packet, the apparatus comprising:

means for receiving at least a previous packet and the current packet, wherein the previous packet comprises a first link layer sequence number, and wherein the current packet comprises the header of the current packet and a second link layer sequence number;

means for determining whether decompression of the header of the current packet failed by receiving a decompression error for the header of the current packet after attempting to decompress the header of the current packet;

means for determining a difference in link layer sequence numbers between the first link layer sequence number of the previous packet and the second link layer sequence number of the current packet, to generate repaired information used for header decompression if the decompression of the header of the current packet failed;

means for determining, if the difference in link layer sequence numbers is determined, if the difference between the first link layer sequence number and the second link layer sequence number is greater than or equal to 2^k, where k is a number of link layer sequence number bits in the current packet, and adding, if the difference is greater than or equal to 2^k, the difference to the first link layer sequence number to generate the repaired information; and means for decompressing the header of the current packet with the repaired information.

27. The apparatus of claim 26, wherein the determining the difference in the link layer sequence numbers is performed in a link layer.

28. The apparatus of claim 26, further comprising at least one of a base station and a terminal, with which the apparatus is integrated.

29. A non-transitory processor-readable memory having instructions thereon, the instructions comprising:

code executable for receiving at least a previous packet and a current packet, wherein the previous packet comprises a first link layer sequence number, and wherein the current packet comprises a header of the current packet and a second link layer sequence number;

code executable for determining whether decompression of the header of the current packet failed by receiving a decompression error for the header of the current packet after attempting to decompress the header of the current packet;

code executable for, if the decompression of the header of the current packet failed, determining a difference in link layer sequence numbers between the first link layer sequence number of the previous packet and the second link layer sequence number of the current packet, to generate repaired information used for header decompression;

code executable for determining, if the difference in link layer sequence numbers is determined, if the difference between the first link layer sequence number and the second link layer sequence number is greater than or equal to 2^k, where k is a number of link layer sequence number bits in the current packet, and adding, if the difference is greater than or equal to 2^k, the difference to the first link layer sequence number to generate the repaired information; and code executable for decompressing the header of the current packet with the repaired information.

30. The processor-readable memory of claim 29, wherein the determining the difference in the link layer sequence numbers is performed in a link layer.

31. The non-transitory processor-readable memory of claim 29, further comprising at least one of a base station and a terminal, with which the processor-readable memory is integrated.

32. At least one processor configured to decompress a header of a current packet, comprising:

a first module for receiving at least a previous packet and the current packet, wherein the previous packet comprises a first link layer sequence number, and wherein the current packet comprises the header of the current packet and a second link layer sequence number;

a second module for determining whether decompression of the header of the current packet failed by receiving a decompression error for the header of the current packet after attempting to decompress the header of the current packet;

a third module for determining a difference in link layer sequence numbers between the first link layer sequence number of the previous packet and the second link layer sequence number of the current packet, to generate repaired information used for header decompression, if the header of the current packet decompression failed;

wherein the third modules is configured to determine if the difference between the first link layer sequence number and the second link layer sequence number is greater than or equal to 2^k, where k is a number of link layer sequence number bits in the current packet, and add, if the difference is greater than or equal to 2^k, the difference to the first link layer sequence number to generate the repaired information; and a fourth module for decompressing the header of the current packet with the repaired information.

33. The processor of claim 32, wherein the determining the difference in the link layer sequence numbers is performed in a link layer.

34. The at least one processor of claim 32, further comprising at least one of a base station and a terminal, with which the at least one processor is integrated.

35. A method for decompressing a packet header, the method comprising:

determining whether decompression of a current packet header failed;

if header decompression failed, determining a difference between a first link layer sequence number of a previous packet and a second link layer sequence number of the current packet to generate repaired information used for header decompression, wherein generating repaired information used for header decompression comprises:

determining if the difference between the first link layer sequence number and the second link layer sequence number is greater than or equal to 2^k, where k is a number of link layer sequence number bits in the current packet;

if the difference is greater than or equal to 2^k, then adding the difference to the first link layer sequence number to provide the repaired information; and determining whether sequence number wraparound occurred, wherein determining whether sequence number wraparound occurred comprises:

determining if the difference is greater than or equal to 2*(L+1), where L is a length of half of an interpretation interval used for decompression;

if the difference is determined to be greater than or equal to 2*(L+1), then determining if the difference is greater than or equal to 2^(k+1);

if the difference is determined to be greater than or equal to 2^(k+1), then decompressing the header of the current packet a plurality of times using a plurality of interpretation intervals; and if decompressing the header is successful in only one of the interpretation intervals, passing the current packet to an upper layer; and decompressing the header of the current packet with the repaired information.

36. An apparatus configured to decompress a packet header, the apparatus comprising a decompressor configured to:

determine whether decompression of a current packet header failed;

if header decompression failed, determine a difference between a first link layer sequence number of a previous packet and a second link layer sequence number of the current packet to generate repaired information used for header decompression determine if the difference between the first link layer sequence number and the second link layer sequence number is greater than or equal to $2^k$, where k is a number of link layer sequence number bits in the current packet; and if the difference is greater than or equal to $2^k$, then add the difference to the first link layer sequence number to provide the repaired information;

determine whether sequence number wraparound occurred, wherein determining whether sequence number wraparound occurred comprises:

determining if the difference is greater than or equal to $2*(L+1)$, where L is a length of half of an interpretation interval used for decompression;

if the difference is determined to be greater than or equal to $2*(L+1)$, then determining if the difference is greater than or equal to $2^{(k+1)}$;

if the difference is determined to be greater than or equal to $2^{(k+1)}$, then decompressing the header of the current packet a plurality of times using a plurality of interpretation intervals; and if decompressing the header is successful in only one of the interpretation intervals, passing the current packet to an upper layer; and decompress the header of the current packet with the repaired information.

37. An apparatus configured to decompress a packet header, the apparatus comprising:

means for determining whether decompression of a current packet header failed;

means for determining a difference between a first link layer sequence number of a previous packet and a second link layer sequence number of the current packet to generate repaired information used for header decompression, if header decompression failed, wherein generating repaired information used for header decompression comprises:

means for determining if the difference between the first link layer sequence number and the second link layer sequence number is greater than or equal to $2^k$, where k is a number of link layer sequence number bits in the current packet;

means for adding the difference to the first link layer sequence number to provide the repaired information, if the difference is greater than or equal to $2^k$; and means for determining whether sequence number wraparound occurred, wherein means for determining whether sequence number wraparound occurred comprises:

determining if the difference is greater than or equal to $2*(L+1)$, where L is a length of half of an interpretation interval used for decompression;

if the difference is determined to be greater than or equal to $2*(L+1)$, then determining if the difference is greater than or equal to $2^{(k+1)}$;

if the difference is determined to be greater than or equal to $2^{(k+1)}$, then decompressing the header of the current packet a plurality of times using a plurality of interpretation intervals; and if decompressing the header is successful in only one of the interpretation intervals, passing the current packet to an upper layer; and means for decompressing the header of the current packet with the repaired information.

38. A non-transitory processor-readable memory having instructions thereon, the instructions comprising:

code executable for determining whether decompression of a current packet header failed;

code executable for determining a difference between a first link layer sequence number of a previous packet and a second link layer sequence number of the current packet to generate repaired information used for header decompression, if header decompression failed, wherein generating repaired information used for header decompression comprises:

code executable for determining if the difference between the first link layer sequence number and the second link layer sequence number is greater than or equal to $2^k$, where k is a number of link layer sequence number bits in the current packet;

code executable for adding the difference to the first link layer sequence number to provide the repaired information, if the difference is greater than or equal to $2^k$; and code executable for determining whether sequence number wraparound occurred, wherein code executable for determining whether sequence number wraparound occurred comprises:

code executable for determining if the difference is greater than or equal to $2*(L+1)$, where L is a length of half of an interpretation interval used for decompression;

if the difference is determined to be greater than or equal to $2*(L+1)$, then code executable for determining if the difference is greater than or equal to $2^{(k+1)}$;

if the difference is determined to be greater than or equal to $2^{(k+1)}$, then code executable for decompressing the header of the current packet a plurality of times using a plurality of interpretation intervals; and if decompressing the header is successful in only one of the interpretation intervals, code executable for passing the current packet to an upper layer; and code executable for decompressing the header of the current packet with the repaired information.

* * * * *